3,822,300
PROCESS FOR THE PRODUCTION OF α,β-UNSATURATED CARBOXYLIC ACIDS
Rainer Osberghaus, Dusseldorf-Urdenbach, Rainer Mehren, Wesel-Lackhausen, and Werner Stein, Erkrath-Unterbach, Germany, assignors to Henkel & Cie GmbH, Dusseldorf-Holthausen, Germany
No Drawing. Filed May 1, 1972, Ser. No. 249,377
Claims priority, application Germany, May 3, 1971, P 21 21 635.3
Int. Cl. C08h 17/36
U.S. Cl. 260—413                                11 Claims

ABSTRACT OF THE DISCLOSURE

A process for the production of long chain α,β-unsaturated carboxylic acids comprises reacting a β-hydroxy nitrile with an aqueous mineral acid, and thermolyzing the resultant product.

---

PRIOR ART

The present invention relates to a process for the production of α,β-unsaturated carboxylic acids.

It is known that α,β-unsaturated carboxylic acids can be obtained from low molecular weight range β-hydroxynitriles, for example, in a process for the manufacture of acrylic acid. However, a technically practical process for producing long chain higher α,β-unsaturated carboxylic acids from corresponding hydroxynitriles has not previously been described. Even for working on a laboratory scale, synthesis reactions, such as the Perkin synthesis or the Knoevenagel reaction have been proposed, which are not operable for a technical production of higher α-β-unsaturated carboxylic acids.

OBJECTS OF THE INVENTION

It is an object of the present invention to provide a process for producing long chain α,β-unsaturated carboxylic acids by reacting a β-hydroxynitrile with an aqueous mineral acid, and thermolyzing the resultant product.

It is another object of the present invention to provide a process for the production of long chain α,β-unsaturated carboxylic acids of the formula

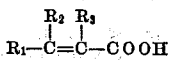

wherein $R_1$, $R_2$ and $R_3$ each represent a member selected from the group consisting of hydrogen and alkyl having 3 to 22 carbons, with the proviso that the total number of carbon atoms in $R_1$, $R_2$ and $R_3$ is at least 3 and no more than 22 consisting essentially of the steps of treating a β-hydroxynitrile of the formula

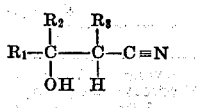

in which $R_1$, $R_2$, $R_3$ have the above assigned meanings with an aqueous mineral acid at a temperature of from 50° to 250° C.; separating the aqueous phase, thermolyzing the resultant product at a temperature of from 100° to 400° C., and recovering the said α,β-unsaturated carboxylic acids.

Other and further objects of the present invention will become apparent as the description thereof proceeds.

DESCRIPTION OF THE INVENTION

The present invention is directed to a process for the production of long chain α,β-unsaturated carboxylic acids of the formula

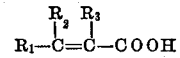

wherein $R_1$, $R_2$ and $R_3$ each represent a member selected from the group consisting of hydrogen and alkyl having 3 to 22 carbons, with the proviso that the total number of carbon atoms in $R_1$, $R_2$ and $R_3$ is at least 3 and no more than 22, consisting essentially of the steps of treating a β-hydroxynitrile of the formula

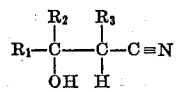

in which $R_1$, $R_2$, $R_3$ have the above assigned meanings with an aqueous mineral acid at a temperature of from 50° to 250° C.; separating the aqeuous phase, thermolyzing the resultant product at a temperature of from 100° to 400° C.; and recovering the said α,β-unsaturated carboxylic acids.

The β-hydroxycarboxylic acid nitriles to be used as starting materials in the process of the present invention can be obtained in a particularly advantageous manner by reacting epoxides with prussic acid in the liquid phase in the presence of a catalyst e.g., a strong base and/or a compound forming cyanide ions.

Acid treatment of the β-hydroxynitriles to be carried out in the first stage of the process of the present invention can be effected by means of conventional mineral acids such as hydrochloric acid, sulfuric acid, phosphoric acid, or even complex acids, with the acid concentration being dependent upon the particular acid used. Advantageously, the ratio between aqueous mineral acid and hydroxynitrile is chosen such that there are from 1 to 5 mols, preferably from 1 to 3 mols, of acid present for each mol of hydroxynitrile. In general, the aqueous mineral acid concentration ranges from 50% to 90%. The mols of mineral acid are calculated as anhydrous acid.

Preferably the acid treatment is effected with sulfuric acid concentrations of from 50% to 80%, particularly from 60% to 70%, being used.

The reaction temperature to be used during the acid treatment in the first stage is also dependent, to a certain extent, (a) upon the nature of the mineral acid to be used, (b) upon the acid concentration of the reaction mixture and (c) upon the hydroxynitrile used. Advantageously, in a preferred embodiment of the process which uses from 50% to 80% sulfuric acid in a quantity ratio of from 1 to 5 mols of sulfuric acid per mol of hydroxynitrile, the reaction temperature in the first stage of the process is from 80° to 150° C.

The duration of acid treatment is also variable, depending (a) upon the acid concentration, (b) upon the reaction temperature and (c) upon the nature of the hydroxynitrile to be converted, and may be from 15 minutes to several hours. The course of the reaction may be observed by checking the hydroxynitrile content, with the optimum time conditions being established by taking into account the other reaction parameters.

The reaction between a hydroxynitrile and a mineral acid can be effected in a simple manner by heating and stirring a mixture of hydroxynitrile and mineral acid in the above-mentioned quantity ratio to the desired reaction temperature and continuing the heating until the nitrile content in the reaction mixture has fallen below a detectable level.

The organic phase of the reaction mixture is subsequently separated, preferably while still hot, and can be directly used as such in the second stage of the process.

Particularly pure final products are obtained if the reaction product of the first stage of the process is treated with water before thermolysis. A procedure which has proved to be particularly satisfactory comprises heating the reaction product with water to the boiling point.

As found from IR and NMR data and chemical characteristics, the product produced in the first stage of the process is an ester-like product. This ester-like product is completely unexpected, since a carboxylic acid would be expected to result from the acid hydrolysis of a nitrile, or in any case, a $\beta$-sulfocarboxylic acid amide would be the expected result as taught in U.S. Pat. 2,425,694. In view of that U.S. patent there is a strong teaching and suggestion away from the process of the present invention, since this U.S. patent states that in the case of ethylenecyanhydrine complete conversion of the nitrile group can be obtained only in an anhydrous medium, i.e. with anhydrous sulfuric acid, whereas the reaction is always incomplete when water is present in the reaction mixture. In contrast to this teaching, it has been found according to the present invention that rapid and complete conversion of the nitrile groups is possible when working in the aqueous medium, and even a fully N-free product results as the end product of this reaction.

The thermolysis of the product of the first stage of the process is carried out in the second stage of the process. This thermolysis may be effected in a particularly advantageous manner by simultaneous distilling-off under a vacuum the unsaturated carboxylic acids produced by the thermolysis. Alternatively, however, thermolysis may be carried out under normal pressure. This latter method is of advantage when higher molecular hydroxynitriles are used as starting materials in the process in accordance with the invention. In such cases the working-up of the products with thermolysis may be effected in a conventional manner, i.e. the raw products may be purified by re-crystallization, re-dissolving, extraction or treatment with adsorption agents. However, since the raw products obtained by thermolysis with simultaneous distilling-off as well as those obtained by thermolysis under normal pressure already have a high degree of purity, further purification will not be required for many intended uses.

In a preferred embodiment of the process of the present invention, the total number of carbon atoms in $R_1$, $R_2$ and $R_3$ is at least 6 and no more than 16. In an especially preferred embodiment of the present invention, the $\beta$-hydroxynitrile reactant is selected from the group consisting of $\beta$-hydroxytridecanoic nitrile, $\beta$-hydroxynonanoic nitrile, $\beta$-hydroxyundecanoic nitrile, $\beta$-hydroxyheptadecanoic nitrile and $\beta$-hydroxynonadecanoic nitrile, and produces an $\alpha$-$\beta$-unsaturated carboxylic acid correspondingly selected from the group consisting of tridecenoic acid, nonenoic acid, undecenoic acid, heptadecenoic acid and nonadecenoic acid.

The products produced by the process of the present invention have uses the same as those uses of natural fatty acids, i.e. after previous hydration to saturated carboxylic acids if required, they may be used in the form of their salts as soaps or as raw materials for producing fatty alcohols, fatty amines, or fatty nitriles, and as starting materials for various tenside synthesis.

The present invention will be further illustrated by reference to the following examples which are not to be deemed limitative in any manner thereof.

EXAMPLE 1

2 kg. of 60% sulfuric acid and 1 kg. $\beta$-hydroxytridecanoic nitrile (molar ratio 2.5:1) were stirred for 6 hours and heated to 115° to 120° C. The organic phase of the reaction mixture, in which nitrogen was no longer detectable, was separated at temperatures of from 60° to 90° C. This organic phase was then heated to 210° to 240° C. in a distilling apparatus having a tempered cooler under an oil pump vacuum (0.2 to 0.05 torr). An almost colorless liquid distilled off above 150° C. which solidified upon cooling. Virtually no residue remained in the distilling flask after heating for a sufficiently long period. The total quantity of distillate was 944 g., i.e. the yield of tridecenoic acid was 95% of theory. The distillate had the following characteristics and analysis data which were in close conformity to the values calculated for tridecenoic acid.

Melting point (° C.) _____ 35–36
Acid number:
 Found _____ 249.9
 Calculated _____ 264.3
Saponification number:
 Found _____ 249
 Calculated _____ 264
Iodine value (by hydrogenation):
 Found _____ 118
 Calculated _____ 119
Molar weight:
 Found _____ 214
 Calculated _____ 212.3
Analysis data:
 C, found _____ 73.1
 C, calculated _____ 73.5
 H, found _____ 11.8
 H, calculated _____ 11.4
 O, found _____ 15.1
 O, calculated _____ 15.1

The constitution trans-2-tridecenoic acid was confirmed by IR analysis and the nuclear resonance spectrum.

EXAMPLES 2 to 5

The hydroxy nitriles set forth below were converted into the corresponding $\alpha,\beta$-unsaturated carboxylic acids in a manner analogous to that given in Example 1. The period of hydrolysis was 6 hours in each case; the hydrolysis temperature was 115° to 120° C., and the mineral acid (sulfuric acid) concentration was 60%. The products which resulted upon hydrolysis were thermolyzed at the temperature given.

| | Example number | | | |
|---|---|---|---|---|
| | 2 | 3 | 4 | 5 |
| | 1-cyano-2-hydroxy-octane | 1-cyano-2-hydroxy-decane | 1-cyano-2-hydroxy-hexadecane | 1-cyano-2-hydroxy-octadecane |
| Thermolysis temperature (° C.) | 220–240 | 210–230 | 220–250 | 210–250 |
| Yield (percent of theory) | 77 | 87 | 90 | 93 |
| B.P. (0.05–1 torr) (° C.) | 100–110 | 130–135 | 165–170 | 180–184 |
| M.P. (° C.) | Liquid | Liquid | 50–58 | 61–62 |
| Acid number | 341 (362) | 294 (302) | 191 (210) | 179 (189) |
| Saponification number | 353 (362) | 292 (302) | 196 (210) | 186 (188) |
| Ester number | 12 | 0 | 5 | 7 |
| Molar weight* | — (156) | 186 (185) | 271 (268) | 301 (296) |
| Iodine value (by hydrogenation) | 153 (163) | 129 (137) | 85 (95) | 88 (86) |
| Percent C | 68.7 (69.4) | 71.1 (71.4) | 74.8 (76.0) | 76.6 (77.1) |
| Percent H | 10.4 (10.3) | 10.9 (10.9) | 12.7 (11.9) | 12.7 (12.2) |
| Percent O | 21.5 (20.4) | 17.5 (17.3) | 11.9 (11.9) | 11.2 (10.8) |
| Ester number of the primary product | | 189 | 135 | 121 |

*Osmometric in acetone.

NOTE.—The numbers in parentheses are the calculated values.

EXAMPLE 6

A primary product having an ester number of 122 was obtained from 1-cyano-2-hydroxy-octadecane by the method given in Example 5. This product was heated to 240° C. for 4 hours under a nitrogen atmosphere at normal pressure. The acid number thereby increased from 54 to 167 (calculated acid number 188). A 65% yield of 2-nonadecenoic acid in the form of a pure colorless substance having a melting point of 60 to 61° C. was obtained upon re-crystallization from petroleum ether of the thermolysis product.

EXAMPLE 7

0.529 kg. (2.5 mol) of 1-cyano-2-hydroxydodecane and 0.715 kg. of 85% phosphoric acid were stirred together for 6 hours while heated to 120° C. Double the volume of water was subsequently added to the reaction mixture and the mixture was heated to boiling. After the organic phase had been separated and dried, this phase was thermolyzed under oil pump vacuum (0.05 to 0.1 torr) at 170° to 230° C. (sump temperature) with simultaneous distillation of the trans-2-tridecenoic acid produced. The yield amounted to 80% of theory.

EXAMPLE 8

Example 1 was repeated but the molar ratio between nitrile and sulfuric acid in the first stage of the process was 1:1.5; the reaction temperature was 134° to 136° C. and hydrolysis lasted for 2 hours. The end product, tridecenoic acid, was obtained in a 87% yield.

EXAMPLE 9

The same amounts of 0.5 kg. of 1-cyano-2-hydroxy-octadecane were hydrolyzed for 5 to 6 hours with sulfuric acid of different concentrations (with constant molar ratio of nitrile:sulfuric acid of 1:2.5) at differing reaction temperatures, and the primary products were thermolyzed at the temperatures given below. The method was otherwise analogous to the method given in Example 1. The yields of nonadecenoic acid were as follows:

| $H_2SO_4$ concentration, percent | Hydrolysis temperature, °C. | Thermolysis temperature, °C. | Yield, percent |
|---|---|---|---|
| 70 | 115 | 210–240 | 89 |
| 65 | 120 | 210–230 | 92 |
| 55 | 125 | 200–240 | 84 |

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the production of long chain α,β-unsaturated carboxylic acids of the formula

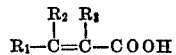

wherein $R_1$, $R_2$ and $R_3$ each represent a member selected from the group consisting of hydrogen and alkyl having 3 to 22 carbons, with the proviso that the total number of carbon atoms in $R_1$, $R_2$ and $R_3$ is at least 3 and no more than 22, consisting essentially of the steps of treating a β-hydroxynitrile of the formula

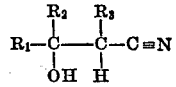

in which $R_1$, $R_2$, $R_3$ have the above assigned meanings with an aqueous mineral acid at a temperature of from 50° to 250° C.; separating the aqueous phase; thermolyzing the resultant product at a temperature of from 100° to 400° C.; and recovering the said α,β-unsaturated carboxylic acids.

2. The process as claimed in claim 1 in which the treatment with the mineral acid is carried out at a temperature of from 80° to 150° C.

3. The process as claimed in claim 1 in which there are from 1 to 5 mols of mineral acid, calculated as anhydrous acid, present per mol of hydroxynitrile.

4. The process as claimed in claim 3 in which there are from 1 to 3 mols of mineral acid, calculated as anhydrous acid, present per mol of hydroxynitrile.

5. The process as claimed in claim 1 in which the mineral acid is sulfuric acid.

6. The process as claimed in claim 5 in which the sulfuric acid has a concentration of from 50% to 80%.

7. The process as claimed in claim 6 in which said sulfuric acid has a concentration of from 60% to 70%.

8. The process as claimed in claim 1 in which the thermolysis is carried out with simultaneous distillation from the reaction medium of the α,β-unsaturated carboxylic acid.

9. The process as claimed in claim 1, in which said total number of carbon atoms in $R_1$, $R_2$ and $R_3$ is at least 6 and no more than 16.

10. The process as claimed in claim 1, in which said β-hydroxynitrile is selected from the group consisting of β-hydroxytridecanoic nitrile, β-hydroxynonanoic nitrile, β-hydroxyundecanoic nitrile, β-hydroxyheptadecanoic nitrile and β-hydroxynonadecanoic nitrile, and produces said α,β-unsaturated carboxylic acid correspondingly selected from the group consisting of tridecenoic acid, nonenoic acid, undecenoic acid, heptadecenoic acid and nonadecenoic acid.

11. A process for the production of long chain α,β-unsaturated carboxylic acids of the formula

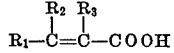

wherein $R_1$, $R_2$ and $R_3$ each represent a member selected from the group consisting of hydrogen and alkyl having 3 to 22 carbons, with the proviso that the total number of carbon atoms in $R_1$, $R_2$ and $R_3$ is at least 3 and no more than 22, consisting essentially of the steps of treating a β-hydroxynitrile of the formula

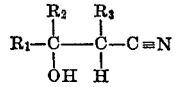

in which $R_1$, $R_2$ and $R_3$ have the above assigned meanings with an aqueous mineral acid having a concentration ranging from 50% to 90% and selected from the group consisting of hydrochloric acid, sulfuric acid, and phosphoric acid in the ratio of from 1 to 5 mols of said mineral acid, calculated as anhydrous acid, per mol of said β-hydroxynitrile at a temperature of from 80° C. to 150° C.; separating the aqueous phase; thermolyzing the resultant product at a temperature of from 100° to 400° C.; and recovering the said α,β-unsaturated carboxylic acids.

References Cited

UNITED STATES PATENTS

| 2,425,694 | 8/1947 | Davis et al. | 260—526 N |
| 2,790,822 | 4/1957 | Wolfram et al. | 260—526 N |
| 3,320,305 | 5/1967 | Wiese | 260—526 N |
| 3,002,023 | 9/1961 | Fikentscher et al. | 260—526 N |

LEWIS GOTTS, Primary Examiner

E. G. LOVE, Assistant Examiner

U.S. Cl. X.R.

260—526 N